United States Patent [19]

Merrouche et al.

[11] Patent Number: 5,246,902
[45] Date of Patent: Sep. 21, 1993

[54] SYNTHETIC MICROPOROUS SOLIDS CONTAINING GALLIUM AND PHOSPHOROUS, THEIR SYNTHESIS AND THEIR USE AS CATALYSTS AND ADSORBENTS

[75] Inventors: Abdallah Merrouche; Joël Patarin, both of Mulhouse; Henri Kessler, Wittenheim; Didier Anglerot, Lons, all of France

[73] Assignee: Societe Nationale Elf Aquitaine, Courbevoie, France

[21] Appl. No.: 830,231

[22] Filed: Jan. 31, 1992

[30] Foreign Application Priority Data

Jan. 31, 1991 [FR] France ................... 91 01106

[51] Int. Cl.$^5$ .................. B01J 31/18; B01J 31/26; B01J 27/12; B01J 23/08
[52] U.S. Cl. .................... 502/167; 502/150; 423/301
[58] Field of Search ............ 502/162, 167, 208, 214, 502/150; 423/301

[56] References Cited

U.S. PATENT DOCUMENTS

| | | | |
|---|---|---|---|
| 4,690,808 | 9/1987 | Wilson et al. | 502/208 X |
| 4,786,487 | 11/1988 | Guenter | 502/214 X |
| 4,880,760 | 11/1989 | Pellet et al. | 502/214 X |

FOREIGN PATENT DOCUMENTS

| | | | |
|---|---|---|---|
| 147991 | 12/1984 | European Pat. Off. | |
| 0158349 | 10/1985 | European Pat. Off. | 502/208 |
| 0187308 | 7/1986 | European Pat. Off. | |
| 0226219 | 6/1987 | European Pat. Off. | |
| 42-018338 | 9/1967 | Japan | 502/162 |

OTHER PUBLICATIONS

Parise, J., "Some Gallium Phosphate Frameworks Related to the Aluminum Phosphate Molecular Sieves", J. Chem. Soc., Chem. Commun., 1985, 606–607.
Patent Abstracts of Japan, vol. 5, No. 58 (C-51)[730], Apr. 21, 1981, JP-A-56-9206, 1981.

*Primary Examiner*—W. J. Shine
*Assistant Examiner*—Douglas J. McGinty
*Attorney, Agent, or Firm*—Burgess, Ryan & Wayne

[57] ABSTRACT

This invention relates to a crystalline synthetic microporous solid containing gallium and phosphorus, whose crystal structure is of the LTA type.

After calcination at a temperature above 200° C. the solid obtained can be employed as a catalyst for converting hydrocarbons or as an adsorbent.

49 Claims, No Drawings

SYNTHETIC MICROPOROUS SOLIDS CONTAINING GALLIUM AND PHOSPHOROUS, THEIR SYNTHESIS AND THEIR USE AS CATALYSTS AND ADSORBENTS

The present invention relates to synthetic microporous solids containing gallium and phosphorus, whose crystal structure is of the LTA type, to their synthesis and to their use as catalysts and adsorbents.

Two types of microporous crystalline gallium phosphates exhibiting molecular sieve properties have been described in European Patent 226,219 (1987). These products correspond to the general formula $$mR : Ga_2O_3 : (1\pm0.2)P_2O_5 : nH_2O$$

where R denotes an organic structuring agent, amine or quaternary ammonium cation, occluded in the channels of the structure and m and n denote the number of moles of R and of $H_2O$ respectively, per mole of $Ga_2O_3$. The Ga/P molar ratio of these materials is practically equal to 1. The $PO_2^+$ positive charge associated with the phosphorus of the tetrahedra is balanced by $GaO_2^-$ associated with the presence of gallium in the tetrahedra.

Once calcined, in order to remove the organic species, the two gallium phosphates can be used as selective adsorbents and as catalysts.

Other microporous crystalline gallium phosphates have been described in the papers "Some gallium phosphate frameworks related to the aluminium phosphate molecular sieves : X-ray structural characterization of $(Pr^iNH_3) Ga_4 (PO_4)_4 OH.H_2O$" by J. B. Parise, J. Chem. Soc. Chem. Comm. 1985, pages 606–607, and "Studies on the syntheses and structures of a novel family of microporous gallophosphates" by Feng Shouhua and Xu Ruren, Chemical Journal of Chinese Universities, 1987, Vol. 8, pages 867–868.

The zeolite structures are catalogued in the "Atlas of zeolite structure types" by W. M. Meier and D. H. Olson (Butterworths 1987). The various structures are identified by a three-letter code. Zeolites of the LTA type (standing for Linde Type A) have been known since 1953.

This structure consists of a three-dimensional assembly of $TO_4$ tetrahedra (T=Si, Al etc.) with shared oxygen apexes. The resulting structure defines channels whose diameter is approximately 4.5 Å.

The synthesis of zeolite A of LTA structural type and of formula $Na_{12}Al_{12}Si_{12}O_{48}.nH_2O$ has been described in U.S. Pat. No. 2,882,243 (1953).

Furthermore, silicoaluminophosphates of LTA structure have been described in U.S. Pat. Nos. 3,355,246 (1967), 3,791,964 (1974) and 4,440,871 (1984).

On the other hand, no gallophosphate of LTA type is known.

This invention relates to a crystalline synthetic microporous solid containing gallium and phosphorus, characterised in that in its anhydrous as-synthesised form it corresponds to the general formula:

$$S_s(Ga_gP_pX_xY_y)O_2F_f$$

where
S denotes the organic structuring agent
X denotes a trivalent element
Y denotes a tetravalent element
s, g, p, x, y and f denote the numbers of moles per two moles of oxygen atoms. Their values are:

$0.01 \leq s \leq 0.2$
$0.1 \leq g \leq 0.5$
$0 2 \leq p \leq 0.5$
$0 \leq x \leq 0.4$
$0 \leq y \leq 0.3$
$0.01 \leq f \leq 0.2$
with $g+p+x+y=1$ and in that the crystal structure is of the LTA type.

The X-ray diffraction pattern of the microporous solids according to the invention includes at least the $d_{hkl}$ values given in Table I.

The preferred values of s, g, p, x, y and f are:
$0.05 \leq s \leq 0.17$
$0.35 \leq g \leq 0.5$
$0.4 \leq p \leq 0.5$
$0 \leq x \leq 0.1$
$0 \leq y \leq 0.1$
$0.12 \leq f \leq 0.17$ The trivalent element is preferably aluminium.

The tetravalent element is silicon, germanium or titanium, preferably silicon.

The organic structuring agent S is generally an amine, preferably a secondary amine.

The raw microporous solid as synthesised contains the organic structuring agent occluded in its cavities. This agent is, on the one hand, associated with the fluoride and, on the other hand, acts as the cation compensating for the negative charge of the structural framework resulting from the incorporation of the tetravalent element such as silicon in the tetrahedra. The solid may also contain water of hydration and inorganic compensating cations if the cations of the organic structuring agent are insufficient in number. The water of hydration represents between 0 and 0.5 moles of water per $S_s(Ga_gP_pX_xY_y))O_2F_f$ formula unit. Dehydration by heating to approximately 150° C. does not generally result in the departure of the organic structuring agent.

The calcination of the as-synthesised form at a sufficient temperature to remove at least a proportion of the structuring agent results in a solid which has empty pores or cavities. The calcination temperature is generally higher than 200° C. and is preferably between 350 and 450° C.

The solid obtained by calcination is stable at least up to 450° C. and its adsorption capacity is 0.148 g of n-hexane per gram of calcined solid, which corresponds to a porosity of at least 0.22 $cm^3 g^{-1}$.

The process of synthesis of the microporous solid consists in producing a reaction mixture containing water, a source of gallium, a source of phosphorus and an organic structuring agent, heating this mixture to a temperature equal to or higher than 40° C. under autogenous pressure for a time sufficient to produce the crystalisation and then separating off the crystalline solid.

The process is characterised in that the reaction mixture contains a source of fluoride anions.

The reaction mixture may also contain sources of a trivalent element, X, and/or sources of a tetravalent element Y.

The molar composition of the reaction mixture, referred to $Ga_2O_3$, is the following:

$$s'S : Ga_2O_3 : p'P_2O_5 : x'X_2O_3 : y'YO_2 : fF : hH_2O$$

where s' varies between 1 and 10 and preferably between 5 and 10 p' varies between 0.1 and 1 and preferably between 0.5 and 1 x' varies between 0 and 1 and preferably between 0 and 0.5 y' varies between 0 and 1.5 and preferably between 0 and 1 f' varies between 0.1 and 4 and preferably between 1 and 3 h' varies between 10 and 500 and preferably between 30 and 100.

Among the secondary amines, the dialkylamines are very particularly suitable. The alkyl chains generally contain 2 to 4 atoms, preferably 3 atoms, of carbon.

The fluoride anions may be introduced in the form of hydrofluoric acid or its salts. These salts are formed with alkali metals, ammonium or preferably with the organic structuring agent. In this latter case the salt is advantageously formed in the reaction mixture between the structuring agent and hydrofluoric acid.

It is also possible to employ hydrolysable compounds capable of releasing fluoride anions in water, such as ammonium fluorosilicate $(NH_4)_2SiF_6$ or sodium fluorosilicate $Na_2SiF_6$ and preferably silicon tetrafluoride $SiF_4$.

Hydrofluoric acid is advantageously employed.

Among the sources of gallium there may be mentioned gallium oxides and hydroxides such as GaOOH, organic gallium compositions such as gallium alkoxides of formula $Ga(OR_1)_3$ where $R_1$ is an alkyl radical, and gallium salts such as gallium fluoride, gallium phosphate or gallium sulphate.

Gallium sulphate is preferably employed.

The preferred source of phosphorus is phosphoric acid $H_3PO_4$, but its salts and esters such as alkali metal phosphates and reactive phosphates of gallium and of a trivalent element or alkyl phosphates are also suitable.

The trivalent element is generally aluminium.

Among the sources of aluminium there may be mentioned oxides and hydroxides such as aluminium hydroxide $Al(OH)_3$, boehmite AlOOH or pseudoboehmite, a preferably reactive alumina such as gamma alumina, salts such as aluminium fluoride, aluminium phosphate, aluminium sulphate or sodium aluminate, as well as the alkoxides $Al(OR_1)_3$ where $R_1$ is an alkyl radical.

Aluminium sulphate is preferably employed.

The tetravalent element is generally silicon.

Many sources of silicon can be employed. It is thus possible to employ oxides in the form of hydrogel, aerogel or of colloidal suspension or oxides produced by precipitation or hydrolysis of esters such as ethyl orthosilicate $Si(OEt)_4$ or by the hydrolysis of complexes such as ammonium fluorosilicate $(NH_4)_2SiF_6$ or sodium fluorosilicate $Na_2SiF_6$.

A colloidal suspension of silica is preferably employed.

The constituent elements of the structural framework, such as gallium, phosphorus, the trivalent elements such as Al and the tetravalent elements such as Si may be present in combined sources such as crystalline gallosilicates and aluminosilicates or preferably in amorphous silica-alumina or silica-gallium oxide gels.

The pH of the reaction mixture is advantageously between 2 and 8 and preferably between 3 and 8.

The pH may be adjusted by the addition of acids such as hydrochloric, sulphuric or acetic acid or of acidic salts such as ammonium hydrogen fluoride or sodium hydrogen sulphate.

Depending on the case, it may be necessary rather to employ bases such as aqueous ammonia, sodium hydroxide, sodium hydrogen carbonate and carbonate or nitrogenous bases such as methylamine.

Buffer mixtures such as the acetate buffer consisting of acetic acid and sodium acetate or the ammoniacal buffer consisting of aqueous ammonia and ammonium chloride are also suitable.

We describe the process of synthesis in greater detail.

The first stage of the process consists in producing the reaction mixture comprising water and the sources of gallium, phosphorus, optionally of a trivalent element such as aluminium and of a tetravalent element such as silicon, of fluoride anions, the organic structuring agent, optionally an additional source of cations for compensating the charges of the structural framework and the compounds with an acidic or basic effect.

The organic structuring agent and the compounds with an acidic or basic effect are generally added last to allow the pH to be adjusted to the desired value.

The second stage consists of the crystallisation of the gel formed. It is carried out by heating this gel to a temperature above 40° C., and generally between 40° C. and 250° C. and preferably between 60° C. and 210° C. under autogenous pressure. A closed polypropylene container is preferably employed in the case of temperatures below 100° C. In the case of temperatures $\geq 100°$ C. an autoclave lined with a polymeric material, generally polytetrafluoroethylene, is employed.

The period of heating needed for the crystallisation depends on the gel composition and on the temperature. It varies between a few hours and 1 or 2 days.

The size and the kinetics of formation of the crystals can be modified by introducing into the reaction mixture seeds consisting of crystals, which may be ground, of the precursor or of the required molecular sieve.

After crystallisation the raw microporous solid as synthesised is separated off by filtration or centrifuging, is washed with distilled water and is air-dried, for example at about 40° C. The solid thus obtained contains, occluded in its cavities, the organic structuring agent, fluoride anions and optionally inorganic compensating cations and water of hydration.

For use as a catalyst for converting hydrocarbons or as an adsorbent it is necessary to free at least a proportion of the pores and cavities in the microporous solid as synthesised. This is done by calcining the solid as synthesised at a sufficient temperature to remove at least a proportion of the structuring agent. The calcination temperature is generally higher than 200° C. and is preferably between 350° C. and 450° C.

The identification of the solids obtained according to the invention is conveniently carried out on the basis of their X-ray diffraction pattern.

This diffraction pattern is obtained with the aid of a diffractometer by employing the conventional powder method with copper $K\alpha$ radiation.

From the position of the diffraction peaks which is represented by the angle $2\theta$ the lattice spacing constants $d_{hkl}$ characteristic of the sample are calculated using the Bragg relationship. The estimate of the measurement error $\Delta(d_{hkl})$ of $d_{hkl}$ is calculated using the Bragg relationship as a function of the absolute error $\Delta(2\theta)$ attributed to the measurement of $2\theta$. An absolute error $\Delta(2\theta)$ equal to $\pm 0.2°$ is commonly accepted. The relative intensity $I_{rel}$ attributed to each value of $d_{hkl}$ is measured according to the height of the corresponding diffraction peak. The analysis of the X-ray diffraction pattern given in Table I is representative of the diffraction pattern of the precursors synthesised.

TABLE I

| $2\theta$ | $d_{hkl}$ | $I_{rel}$ |
|---|---|---|
| 7.2–7.5 | 12.3–11.8 | VS |
| 10.3–10.5 | 8.58–8.42 | m–S |
| 12.6–12.8 | 7.02–6.91 | w–m |
| 14.6–14.8 | 6.06–5.98 | w–mw |
| 16.3–16.5 | 5.43–5.37 | vw–w |
| 18.0–18.2 | 4.92–4.87 | vw |
| 20.8–21.0 | 4.27–4.23 | vw–w |
| 21.8–22.0 | 4.07–4.04 | vw |
| 22.1–22.3 | 4.02–3.98 | mw–m |
| 23.3–23.5 | 3.81–3.78 | vw |
| 24.4–24.6 | 3.64–3.62 | w–m |
| 26.6–26.8 | 3.35–3.32 | w–mw |
| 27.7–27.9 | 3.22–3.19 | vw–w |
| 28.4–28.6 | 3.14–3.12 | vw |
| 30.5–30.7 | 2.928–2.909 | w–mw |
| 31.4–31.6 | 2.846–2.829 | vw–w |
| 32.1–32.3 | 2.786–2.769 | vw–w |
| 33.8–34.0 | 2.649–2.635 | vw–w |
| 34.9–35.1 | 2.568–2.554 | vw–w |
| 35.5–35.7 | 2.526–2.513 | vw |
| 36.5–36.7 | 2.459–2.447 | vw |
| 37.2–37.4 | 2.415–2.402 | vw |
| 38.8–39.0 | 2.319–2.307 | vw |
| 45.1–45.3 | 2.009–2.000 | vw–w |
| 46.5–46.7 | 1.951–1.943 | vw |
| 48.4–48.6 | 1.879–1.872 | vw |
| 49.0–49.2 | 1.857–1.850 | vw |

VS = very strong
S = strong
m = medium
mw = medium weak
w = weak
vw = very weak

The following examples are given to illustrate the invention without any limitation being implied.

EXAMPLE 1

4.1 g of gallium sulphate hydrate (the $H_2O/Ga_2(SO_4)_3$ molar ratio is close to 25) are dissolved in 3.7 g of distilled water. The sulphate is obtained by dissolving gallium (Grade 1 from Johnson Matthey) in hot concentrated $H_2SO_4$, in excess, taking up the suspension obtained in ethanol at a concentration of 60% in water at normal temperature, reprecipitation, in this cooled solution, of gallium sulphate hydrate by adding ether followed by filtration and controlled drying. 1.15 g of 85% phosphoric acid (Prolabo) are added with stirring followed by 0.25 g of 40% hydrofluoric acid (Fluka) and, lastly, 4.55 g of di-n-propylamine (Fluka), abbreviated to DPA in what follows. Stirring is continued for approximately 15 minutes. The pH is then 6.

The molar composition of the final mixture is the following:

9 DPA : 1 $Ga_2O_3$ : 1 $P_2O_5$ : 1HF : 70 $H_2O$

The gel is poured over into an autoclave fitted with a polytetrafluoroethylene liner and heated to 140° C. for 24 h. After cooling, the solid is filtered off, washed with distilled water and dried at about 40° C.

Inspection with an optical microscope and with a scanning electron microscope (SEM) shows crystals in the form of generally isolated cubes with an edge from 2 to 10 micrometers. X-ray diffraction analysis of the precursor as synthesised shows that it is a phase of LTA structural type whose diffraction pattern corresponds to that of Table I.

Chemical analysis of the solid gives the following weight composition in %:

C : 11.30 ; N : 2.05 ; F : 2.55 ; Ga : 29.35 ; P : 14.22

The corresponding chemical formula for the anhydrous form is the following:

$DPA_{0.17}(Ga_{0.48}P_{0.52})O_2F_{0.15}$

The losses in weight, measured by thermogravimetry, on heating under a stream of argon up to 380° C. are the following:

| $H_2O$ | DPA + F |
|---|---|
| 5.9% | 20.7% |

The adsorption capacity for n-hexane was determined with the aid of an electronic balance on a sample calcined in situ under reduced pressure (1 mbar) at 380° C. for 2 h. At 23° C. and n-hexane p/po of 0.5, the measured adsorption capacity is 0.148 g of n-hexane per gram of calcined solid, that is a porosity of 0.22 $cm^3$ per gram.

EXAMPLE 2

This example illustrates the primordial role of the fluoride ions in the synthesis mixture for obtaining the LTA structural type.

A test was carried out in the absence of fluoride ions under the conditions of Example 1.

Inspection with an optical microscope and with the SEM of the crystalline solid obtained shows hexagonal prismatic crystals approximately 100 micrometers × 100 micrometers in size. The X-ray diffraction pattern obtained is given in Table II.

It resembles the X-ray diffraction pattern of the microporous solid marked $GaPO_4$—a of European Patent 226,219.

TABLE II

| $2\theta$ | $d_{hkl}$ (Å) | $I_{rel}$ |
|---|---|---|
| 8.24 | 10.71 | 100 |
| 9.79 | 9.03 | 6 |
| 10.55 | 8.38 | 37 |
| 13.37 | 6.61 | 1 |
| 14.30 | 6.18 | 5 |
| 15.21 | 5.82 | 1 |
| 16.54 | 5.36 | 3 |
| 17.34 | 5.11 | 4 |
| 17.86 | 4.96 | 4 |
| 19.63 | 4.52 | 5 |
| 20.94 | 4.24 | 3 |
| 21.89 | 4.06 | 8 |
| 22.52 | 3.94 | 8 |
| 22.73 | 3.91 | 7 |
| 24.84 | 3.58 | 5 |
| 26.47 | 3.36 | 3 |
| 26.93 | 3.31 | 3 |
| 28.76 | 3.10 | 4 |
| 29.25 | 3.05 | 2 |
| 29.97 | 2.979 | 3 |
| 30.64 | 2.915 | 3 |
| 31.87 | 2.805 | 4 |
| 33.37 | 2.682 | 2 |
| 33.78 | 2.651 | 4 |
| 36.67 | 2.448 | 2 |
| 40.25 | 2.238 | 3 |
| 42.52 | 2.124 | 1 |
| 45.63 | 1.986 | 1 |
| 47.51 | 1.912 | 1 |

EXAMPLE 3

The procedure is as in Example 1 but the gel is heated in an autoclave at 200° C. for 6 hours.

Inspection of the solid with an optical microscope shows crystals in the form of cubes with a side of approximately 1 micrometer. The X-ray diffraction pattern of the raw product of synthesis corresponds to that of Table I.

EXAMPLE 4

The composition of the reaction mixture is identical with that of Example 1. The pH of the mixture before heating is 4.5-5.

The gel is transferred to a screw-topped polypropylene bottle and then heated to 80° C. for 36 h.

After heating, the solid is completely crystallised in the form of cubes; its X-ray diffraction pattern corresponds to that of Table I.

EXAMPLE 5

This example shows that the lowering of the pH to its lower limit results in large-sized crystals.

4.077 g of gallium sulphate hydrate are dissolved in 3.64 g of distilled water and 1.15 g of phosphoric acid (85%) are stirred in, followed by 0.665 g of HF (40%) and, finally, 3.36 g of di-n-propylamine. The pH of the homogenised mixture is 3. The composition of the reaction mixture is the following:

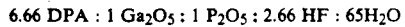
6.66 DPA : 1 Ga$_2$O$_5$ : 1 P$_2$O$_5$ : 2.66 HF : 65H$_2$O

Heating is performed as in Example 1 in an autoclave at 140° C. for 24 hours.

After crystallisation (final pH=2.5) the solid is filtered off, washed with distilled water and dried at about 40° C. The cubic crystals obtained are from 8 to micrometers in size. The X-ray diffraction spectrum corresponds to that of Table I.

EXAMPLE 6

Preparation of a silicogallophosphate of LTA structural type.

In this preparation a colloidal silica marketed under the name of Ludox AS 40 is employed. Its chemical composition by weight is 41.6% SiO$_2$ and 58.4% H$_2$O.

The sources of gallium, phosphorus, fluoride and organic structuring agent are otherwise the same as in Example 1.

4.58 g of gallium sulphate hydrate are dissolved in 2.92 g of distilled water, 0.722 g of Ludox AS 40 are added, followed by 4.97 g of di-n-propylamine. After homogenisation, 1.15 g of 85% phosphoric acid and 0.665 g of 40% hydrofluoric acid are added to the preparation.

The molar chemical composition of the reaction mixture is:

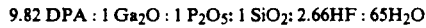
9.82 DPA : 1 Ga$_2$O : 1 P$_2$O$_5$: 1 SiO$_2$: 2.66HF : 65H$_2$O

The pasty gel obtained after stirring (pH=4.5) is placed in the same type of autoclave as previously and heated to 140° C. for 24 h.

After reaction (final pH=4) the completely crystalline solid is filtered off, washed and dried at 40° C. 1.5 g of 40 to 50-micrometer cubic crystals are obtained. The X-ray diffraction pattern corresponds to that of Table I.

Chemical analysis for Ga, P and Si in the crystals, performed with the aid of a scanning electron microscope equipped with an X-energy scatter spectrometer results in the following formula reduced to one tetrahedron of structural framework:

(Si$_{0.035}$Ga$_{0.517}$P$_{0.448}$)O$_2$

EXAMPLE 7

This example illustrates the possibility of preparing, by lowering of the pH, a silicogallophosphate of LTA type in which the cubic crystals are of the order of 130 micrometers in size.

4.077 g of gallium sulphate hydrate are dissolved in 2.92 g of water. 0.722 g of Ludox (containing 41.6% are added followed by 3.37 g of di-n-propylamine.

After homogenisation 1.15 g of 85% phosphoric acid and 0.66 g of 40% hydrofluoric acid are added.

The molar composition of the reaction mixture in this case is the following:

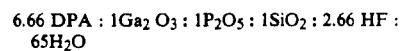
6.66 DPA : 1Ga$_2$O$_3$ : 1P$_2$O$_5$ : 1SiO$_2$ : 2.66 HF : 65H$_2$O

After stirring, the gel obtained (pH=3.5) is heated in an autoclave at 140° C. for 23 hours.

After reaction the pH is close to 2 and the solid collected consists of two phases:

- a predominant compound of LTA structure in which the cubic crystals are of the order of 130 micrometers in size;
- a minor compound, unidentified, in which the crystallites (fibrils) are of the order of 5 micrometers ×60 micrometers in size.

The Si/(Si+Ga+P) molar ratio of the crystals, determined by electron microprobe analysis, is of the order of 0.026.

EXAMPLE 8

Preparation of an aluminogallophosphate of LTA structural type.

In this example a proportion of the source of gallium is replaced with a source of aluminium (Al$_2$(SO$_4$)$_3$.18-H$_2$O from Prolabo).

3.67 g of gallium sulphate hydrate are dissolved in 3.76 g of water and 0.666 g of aluminium sulphate are added followed by 4.55 g of di-n-propylamine.

After homogenisation, 1.15 g of phosphoric acid (85%) and 0.25 g of hydrofluoric acid (40%) are added.

The molar composition of the reaction mixture is:

9DPA : 0.8 Ga$_2$O$_3$ : 0.2Al$_2$O$_3$ : 1P$_2$O$_3$ : 1HF : 70H$_2$O After stirring, the gel obtained (pH : 4.5-5) is Placed in the same type of autoclave as previously and heated to 140° C. for 20 h.

After reaction (final pH=4), the solid obtained is washed with distilled water at about 40° C. It consists of cubic crystals of LTA types of approximately 80 micrometers and of a phase of quartz type. Analysis of the cubic crystals with a scanning electron microscope fitted with an X-analysis spectrometer results in the structural framework formula:

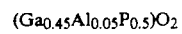
(Ga$_{0.45}$Al$_{0.05}$P$_{0.5}$)O$_2$

We claim:

1. A crystalline synthetic microporous solid containing gallium and phosphorous, having an LTA crystal structure, and in its anhydrous as-synthesized form, corresponds to the formula:

$$S_s(Ga_gP_pX_xY_y)O_2F_f$$

wherein
S is an organic structuring agent;
X is a trivalent element;
Y is a tetravalent element; and
s,g,p,x,y and f denote the numbers of moles per two moles of oxygen atoms, and have a value:
$0.01 \leq s \leq 0.2$
$0.1 \leq g \leq 0.5$
$0.2 \leq p \leq 0.5$
$0 \leq x \leq 0.4$
$0 \leq y \leq 0.3$
$0.01 \leq f \leq 0.2$
where $g+p+x+y=1$.

2. A solid of claim 1, wherein s is from 0.05 to 0.17.
3. A solid of claim 1, wherein g is from 0.35 to 0.5.
4. A solid of claim 1, wherein p is from 0.4 to 0.5.
5. A solid of claim 1 wherein x is from 0 to 0.1.
6. A solid of claim 1, wherein y is from 0 to 0.1.
7. A solid of claim 1, wherein f is from 0.12 to 0.17.
8. A solid of claim 1 wherein the trivalent element X is aluminium.
9. A solid of claim 1 wherein the tetravalent element Y comprises silicon.
10. A solid of claim 1 having an X-ray diffraction pattern which includes at least the values of $d_{hkl}$ of Table I.
11. A solid of claim 1 wherein the organic structuring agent comprises at least one amine selected from the group consisting of primary and secondary amines.
12. A microporous solid obtained by calcining the solid of claim 1 at a temperature sufficient to remove at least a portion of the structuring agent.
13. A solid of claim 12, wherein the calcination temperature is above about 200°.
14. A solid according to claim 12 having an adsorption capacity of about 0.148 g of n-hexane per gram and a porosity of at least 0.22 $cm^3g^{-1}$.
15. A process for the synthesis of a microporous crystalline solid of claim 1, which comprises: (a) forming a reaction mixture containing water, a source of gallium, a source of phosphorus, a source of fluoride anions and an organic structuring agent; (b) heating the mixture to a temperature of at least about 40° C. under at least autogenous pressure for a time sufficient to form a crystalline solid; and (c) recovering the crystalline solid.
16. A process of claim 15, wherein the reaction mixture contains a source of a trivalent element X.
17. A process of claim 15, wherein the reaction mixture contains a source of a tetravalent element Y.
18. A process of claim 15 wherein the molar composition of the reaction mixture comprises $$s'S : Ga_2O_3 : p'P_2O_5 : x'X_2O_3 : y'YO_2 : f'F : hH_2O$$

where
s' is from 1 to 10;
p' is from 0.1 to 1;
x' is from 0 to 1;
y' is from 0 to 1.5;
f' is from 0.1 to 4; and
h is from 10 to 500.

19. A process of claim 15 wherein the source of fluoride anions comprises at least one composition selected from the group consisting of hydrofluoric acid, salts of hydrofluoric acid with alkali metals, salts of hydrofluoric acid with ammonium, salts of hydrofluoric acid with an organic structuring agent, ammonium fluorosilicate, sodium fluorosilicate and silicon tetrafluoride.
20. A process of claim 19 wherein the source of fluoride anions comprises hydrofluoric acid.
21. A process of claim 15 wherein the source of gallium is gallium oxide or gallium hydroxide.
22. A process of claim 15 wherein the source of gallium comprises an organic gallium composition.
23. A process of claim 15 wherein the source of gallium comprises at least one gallium salt selected from the group consisting of gallium fluoride, gallium phosphate and gallium sulphate.
24. A process of claim 15 wherein the source of phosphorus comprises at least one composition selected from the group consisting of phosphoric acid salts and phosphoric acid esters.
25. A process of claim 16 wherein the trivalent element comprises aluminium.
26. A process of claim 25 wherein the source of aluminium comprises at least one composition selected from the group consisting of aluminum oxide, aluminium hydroxide, aluminium alkoxide, boehmite, pseudoboehmite, gamma aluminum, aluminium salts and sodium aluminate.
27. A process of claim 17 wherein the tetravalent element comprises silicon.
28. A process of claim 27 wherein the source of silicon comprises a silicon oxide in the form of a hydrogel, an aerogel or a colloidal suspension.
29. A process according to claim 28 wherein the colloidal suspension is a colloidal suspension of silica.
30. A process of claim 29 wherein the silica is formed by hydrolysis of a silicate composition or precipitation from a silicate composition.
31. A process of claim 15 wherein the organic structuring agent is an amine.
32. A process of claim 31 wherein the amine is a dialkylamine.
33. A process of claim 32 wherein the alkyl groups each contain 2 to 4 carbon atoms.
34. A process of claim 15 wherein the pH of the reaction mixture is from 2 to 8.
35. A process of claim 34 wherein the pH of the reaction mixture is adjusted by the addition of at least one composition comprising at least one member selected from the group consisting of hydrochloric acid, sulphuric acid, acetic acid, ammonium hydrogen fluoride, sodium hydrogen sulphate, ammonia, sodium hydroxide, sodium hydrogen carbonate, sodium carbonate, methylamine, acetate buffer mixtures and ammoniacal buffer mixtures.
36. A process of claim 15 wherein the reaction mixture is heated to a temperature of from 40° to 250° C. for a period sufficient to produce crystallization.
37. A solid of claim 1 wherein p is from 0.4 to 0.5; x is from 0 to 0.1 and y is from 0 to 0.1.
38. A solid of claim 11 wherein the structuring agent comprises a secondary amine.
39. A solid of claim 13 wherein the calcination temperature is from about 200° C. to about 450° C.
40. A process of claim 18 wherein
s' is from 5 to 10;

p' is from 0.5 to 1.0;
x' is from 0 to 0.5;
y' is from 0 to 1.0;
f' is from 1 to 3; and
h is from 30 to 100.

41. A process of claim 22 wherein the organic gallium composition comprises a gallium alkoxide.

42. A process of claim 23 wherein the source of gallium comprises gallium sulfate.

43. A process of claim 24 wherein the source of phosphorus comprises at least one member selected from the group consisting of alkali metal phosphate, gallium phosphate, and alkyl phosphate.

44. A process of claim 24 wherein the source of phosphorus comprises phosphoric acid.

45. A process of claim 26 wherein the source of aluminum comprises aluminium sulfate.

46. A process of claim 28 wherein the source of silicon comprises a colloidal suspension of silica.

47. A process of claim 33 wherein the alkyl groups each contain three carbon atoms.

48. A process of claim 34 wherein the pH is from about 3 to about 8.

49. A process of claim 36 wherein the reaction mixture is heated at a temperature of from 60° C. to 210° C.

* * * * *